United States Patent
Angel et al.

(10) Patent No.: US 10,538,451 B2
(45) Date of Patent: Jan. 21, 2020

(54) GLASS OR METAL FORMING MOLD OF ADJUSTABLE SHAPE

(71) Applicant: THE ARIZONA BOARD OF REGENTS ON BEHALF OF THE UNIVERSITY OF ARIZONA, Tucson, AZ (US)

(72) Inventors: Roger P. Angel, Tucson, AZ (US); Thomas E. Stalcup, Jr., Tucson, AZ (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 169 days.

(21) Appl. No.: 15/694,327

(22) Filed: Sep. 1, 2017

(65) Prior Publication Data

US 2017/0369355 A1    Dec. 28, 2017

Related U.S. Application Data

(63) Continuation-in-part of application No. PCT/US2016/020415, filed on Mar. 2, 2016.

(60) Provisional application No. 62/127,178, filed on Mar. 2, 2015.

(51) Int. Cl.
    *C03B 23/025* (2006.01)
(52) U.S. Cl.
    CPC ................ *C03B 23/0252* (2013.01)

(58) Field of Classification Search
    CPC ... C03B 23/0256; C03B 23/0305; C21D 7/13; C21D 8/0252; C21D 8/0226
    See application file for complete search history.

(56) References Cited

U.S. PATENT DOCUMENTS

| | | |
|---|---|---|
| 608,755 A | 8/1898 | Cottle |
| 642,196 A | 1/1900 | Belcher |
| 670,917 A | 3/1901 | Eneas |
| 811,274 A | 1/1906 | Carter |
| 2,661,672 A | 12/1953 | Fairbanks |

(Continued)

FOREIGN PATENT DOCUMENTS

| | | |
|---|---|---|
| AU | 2009246638 | 11/2009 |
| CA | 2722714 | 7/2014 |

(Continued)

OTHER PUBLICATIONS

USPTO; Non-Final Office Action dated Jul. 27, 2018 in U.S. Appl. No. 15/543,625.

(Continued)

*Primary Examiner* — Cynthia Szewczyk
(74) *Attorney, Agent, or Firm* — Snell & Wilmer, L.L.P.

(57) ABSTRACT

A system for shaping glass or metal sheets or panels for use in solar collectors or microwave antennae may include an oven and an adjustable mold. The adjustable mold may comprise a molding surface located within the oven. The molding surface may be coupled to position actuators located outside of the oven via coupling elements. A sheet or panel may be placed in the oven and heated until the sheet or panel softens and takes the shape of the molding surface. The molding surface may be adjusted to achieve different shapes for glass or metal sheets or panels.

17 Claims, 12 Drawing Sheets

(56) References Cited

U.S. PATENT DOCUMENTS

| | | | |
|---|---|---|---|
| 2,827,690 A | 3/1958 | Brown | |
| 2,904,612 A | 9/1959 | Regnier | |
| 3,427,200 A | 2/1969 | Ernest et al. | |
| 3,552,941 A | 1/1971 | Giffen | |
| 3,586,492 A | 6/1971 | McMaster | |
| 3,756,797 A | 9/1973 | Akeyoshi | |
| 3,977,773 A | 8/1976 | Hubbard | |
| 4,074,996 A * | 2/1978 | Hagedorn | C03B 23/0256 65/106 |
| 4,088,470 A | 5/1978 | Bourg et al. | |
| 4,105,429 A | 8/1978 | Delgado | |
| 4,107,521 A | 8/1978 | Winters | |
| 4,154,219 A | 5/1979 | Gupta et al. | |
| 4,180,414 A | 12/1979 | Diamond et al. | |
| 4,245,895 A | 1/1981 | Wildenrotter | |
| 4,313,746 A | 2/1982 | Juras | |
| 4,354,193 A | 10/1982 | Werner | |
| 4,404,565 A | 9/1983 | Gurney et al. | |
| 4,436,373 A | 3/1984 | Kirsch | |
| 4,461,278 A | 7/1984 | Mori | |
| 4,473,065 A | 9/1984 | Bates | |
| 4,522,641 A * | 6/1985 | Hagedorn | C03B 23/03 65/273 |
| 4,525,196 A | 6/1985 | Fecik et al. | |
| 4,535,961 A | 8/1985 | Sobeczak | |
| 4,547,650 A | 10/1985 | Arditty | |
| 4,568,156 A | 2/1986 | Dane | |
| 4,575,207 A | 3/1986 | August | |
| 4,616,909 A | 10/1986 | Dane | |
| 4,678,292 A | 7/1987 | Miyatani et al. | |
| 4,805,006 A | 2/1989 | Yamagushi et al. | |
| 4,830,678 A | 5/1989 | Todorof et al. | |
| 4,897,102 A * | 1/1990 | Modesitt | C03B 23/03 65/287 |
| 4,909,819 A * | 3/1990 | McMaster | C03B 23/0256 65/104 |
| 4,999,059 A | 3/1991 | Bagno | |
| 5,118,543 A | 6/1992 | McColl | |
| 5,129,934 A | 7/1992 | Koss | |
| 5,143,535 A | 9/1992 | Herrington | |
| 5,147,437 A | 9/1992 | Bristol | |
| 5,169,456 A | 12/1992 | Johnson | |
| 5,215,567 A * | 6/1993 | Clark | C03B 23/0252 264/239 |
| 5,281,249 A | 1/1994 | Hampton et al. | |
| 5,363,116 A | 11/1994 | Allen | |
| 5,460,659 A | 10/1995 | Krut | |
| 5,593,901 A | 1/1997 | Oswald et al. | |
| 5,695,538 A * | 12/1997 | Goolsbay | C03B 23/0305 65/106 |
| 5,697,999 A | 12/1997 | Reunamaki | |
| 5,787,878 A | 8/1998 | Ratliff | |
| 5,849,056 A * | 12/1998 | May | C03B 23/0305 65/106 |
| 6,034,319 A | 3/2000 | Falbel | |
| 6,091,017 A | 7/2000 | Stern | |
| 6,123,067 A | 9/2000 | Warrick | |
| 6,257,022 B1 | 7/2001 | Caplan et al. | |
| 6,301,932 B1 | 10/2001 | Allen et al. | |
| 6,375,135 B1 | 4/2002 | Eason et al. | |
| 6,378,339 B1 | 4/2002 | Zalesak et al. | |
| 6,498,290 B1 | 12/2002 | Lawheed | |
| 6,541,694 B2 | 4/2003 | Winston | |
| 6,563,040 B2 | 5/2003 | Hayden et al. | |
| 6,566,635 B1 | 5/2003 | Matsen et al. | |
| 6,629,436 B1 | 10/2003 | Skeen | |
| 6,739,729 B1 | 5/2004 | Blackmon et al. | |
| 6,848,442 B2 | 2/2005 | Haber | |
| 6,895,145 B2 | 5/2005 | Ho | |
| 7,076,965 B2 | 7/2006 | Lasich | |
| 7,258,320 B2 | 8/2007 | Tai | |
| 7,297,865 B2 | 11/2007 | Terao et al. | |
| 7,380,549 B1 | 6/2008 | Ratliff | |
| 7,503,189 B2 | 3/2009 | Fukuyama | |
| 7,506,847 B2 | 3/2009 | Bailey | |
| 8,082,755 B2 | 12/2011 | Angel | |
| 8,319,697 B2 | 11/2012 | Conrad | |
| 8,350,145 B2 | 1/2013 | Angel | |
| 8,430,090 B2 | 4/2013 | Angel | |
| 8,505,867 B2 | 8/2013 | Conrad | |
| 8,604,333 B2 | 12/2013 | Angel | |
| 8,662,072 B2 | 3/2014 | Butler | |
| 9,318,635 B2 | 4/2016 | Luo | |
| 2001/0036024 A1 | 11/2001 | Wood | |
| 2003/0005954 A1 | 1/2003 | Emoto et al. | |
| 2003/0070705 A1 | 4/2003 | Hayden et al. | |
| 2004/0107731 A1 | 6/2004 | Doehring et al. | |
| 2005/0051205 A1 | 3/2005 | Mook et al. | |
| 2005/0081909 A1 | 4/2005 | Paull | |
| 2005/0166957 A1 | 8/2005 | Imoto et al. | |
| 2006/0054162 A1 | 3/2006 | Romeo | |
| 2006/0057847 A1 | 3/2006 | Yanagawa et al. | |
| 2006/0231133 A1 | 10/2006 | Fork | |
| 2006/0243319 A1 | 11/2006 | Kusek et al. | |
| 2007/0012934 A1 | 1/2007 | Abu-Ageel | |
| 2007/0089774 A1 | 4/2007 | Lasich | |
| 2007/0089778 A1 | 4/2007 | Horne et al. | |
| 2007/0095341 A1 | 5/2007 | Kaneff | |
| 2007/0256726 A1 | 11/2007 | Ford et al. | |
| 2007/0272666 A1 | 11/2007 | O'Brien | |
| 2008/0000516 A1 | 1/2008 | Shifman | |
| 2008/0047605 A1 | 2/2008 | Benitez et al. | |
| 2008/0053513 A1 | 3/2008 | Palmer | |
| 2008/0092877 A1 | 4/2008 | Monsebroten | |
| 2008/0185034 A1 | 8/2008 | Corio | |
| 2009/0032102 A1 | 2/2009 | Chen et al. | |
| 2009/0056790 A1 | 3/2009 | Tian | |
| 2009/0126778 A1 | 5/2009 | Brounne et al. | |
| 2009/0277224 A1 | 11/2009 | Angel et al. | |
| 2009/0277498 A1 | 11/2009 | Angel | |
| 2010/0037937 A1 | 2/2010 | Sater | |
| 2010/0095999 A1 | 4/2010 | Menon | |
| 2010/0126556 A1 | 5/2010 | Benitex et al. | |
| 2010/0139645 A1 | 6/2010 | Whipple | |
| 2012/0174966 A1 | 7/2012 | Snipes | |
| 2012/0192919 A1 | 8/2012 | Mizuyama | |
| 2012/0229911 A1 | 9/2012 | Rodriguez-Parada et al. | |
| 2012/0260908 A1 | 10/2012 | Orsello | |
| 2012/0312349 A1 | 12/2012 | Farberov | |
| 2012/0316017 A1 | 12/2012 | Chiel | |
| 2012/0318324 A1 | 12/2012 | Ning et al. | |
| 2013/0068285 A1 | 3/2013 | Ni et al. | |
| 2013/0206935 A1 | 8/2013 | Majid et al. | |
| 2013/0323415 A1 * | 12/2013 | Brackley | B41M 5/007 427/171 |
| 2014/0053607 A1 | 2/2014 | Angel | |
| 2014/0090687 A1 | 4/2014 | Den Boer et al. | |
| 2014/0116419 A1 | 5/2014 | Hernandez et al. | |
| 2014/0130843 A1 | 5/2014 | Kostuk et al. | |
| 2014/0160784 A1 | 6/2014 | Badahdah et al. | |
| 2014/0201109 A1 | 7/2014 | Tilley | |
| 2014/0209146 A1 | 7/2014 | Park | |
| 2014/0238387 A1 | 8/2014 | Kroyzer et al. | |
| 2014/0251308 A1 | 9/2014 | Wyle et al. | |
| 2014/0261387 A1 | 9/2014 | Hansen | |
| 2014/0261392 A1 | 9/2014 | Lambrecht | |
| 2014/0374550 A1 | 12/2014 | Straeter | |
| 2015/0303867 A1 | 10/2015 | Angel | |
| 2015/0316639 A1 | 11/2015 | Russ | |
| 2015/0323124 A1 | 11/2015 | Erdos | |
| 2016/0238189 A1 | 8/2016 | Angel | |
| 2016/0251093 A1 | 9/2016 | Hijmans | |

FOREIGN PATENT DOCUMENTS

| | | |
|---|---|---|
| CN | 2597897 | 1/2004 |
| CN | 2599483 | 1/2004 |
| DE | 3104690 | 8/1982 |
| DE | 202007016715 | 3/2008 |
| EP | 1903155 | 3/2008 |
| EP | 1956662 | 8/2008 |
| EP | 1956662 | 12/2009 |
| FR | 2434343 | 4/1980 |

(56) References Cited

FOREIGN PATENT DOCUMENTS

| | | |
|---|---|---|
| GB | 770097 | 3/1957 |
| GB | 1529409 | 10/1978 |
| GB | 2471816 | 10/2012 |
| JP | 491610 | 1/1974 |
| JP | 58194751 | 11/1983 |
| JP | 6060934 | 4/1985 |
| JP | 2003069069 | 6/1986 |
| JP | 63021229 | 1/1988 |
| JP | 0598895 | 4/1993 |
| JP | 8194103 | 7/1996 |
| JP | 61119081 | 3/2000 |
| JP | 2000091612 | 3/2000 |
| JP | 2000243983 | 9/2000 |
| JP | 2003258291 | 9/2003 |
| JP | 2005206458 | 8/2005 |
| TW | 332104 | 11/2007 |
| WO | WO2005042420 | 5/2005 |
| WO | WO2008013976 | 1/2008 |
| WO | WO2008043871 | 4/2008 |
| WO | WO2009008996 | 1/2009 |
| WO | WO2009121174 | 10/2009 |
| WO | WO2010051599 | 5/2010 |
| WO | WO2010091391 | 8/2010 |
| WO | WO2012032462 | 3/2012 |
| WO | WO2012097260 | 7/2012 |
| WO | WO2015117134 | 8/2015 |

OTHER PUBLICATIONS

International Search Report and Written Opinion dated Sep. 18, 2018 in PCT Application No. PCT/US18/30491.
International Search Report and Written Opinion dated May 5, 2016 from Corresponding International Application PCT/US2016/20415.
International Preliminary Report on Patentability dated Sep. 14, 2017 from Corresponding International Application PCT/US2016/20415.
USPTO; Final Office Action dated Feb. 19, 2019 in U.S. Appl. No. 15/543,625.
USPTO; Notice of Allowance dated May 1, 2019 in U.S. Appl. No. 15/543,625.
USPTO; Non-Final Office Action dated Apr. 18, 2019 in U.S. Appl. No. 15/748,792.
International Preliminary Report on Patentability dated May 6, 2016 from International Application PCT/US2014/061584.
International Search Report and Written Opinion dated Jan. 27, 2015 from corresponding International Application PCT/US2014/061584.
International Preliminary Report on Patentability dated Jun. 11, 2015 from corresponding International Application PCT/US2013/071974.
International Search Report and Written Opinion dated Apr. 2, 2014 from corresponding International Application PCT/US2013/071974.
Nishi et al., USPTO Translation of JP-60-60934, created Dec. 2015, pp. 1-22.
International Search Report and Written Opinion dated Aug. 25, 2009 from International Application PCT/US2009/043381.
International Search Report and Written Opinion from Int'l Application No. PCT/US09/043377 dated May 28, 2010.
International Preliminary Report on Patentability from Int'l Application No. PCT/US09/043381 dated Aug. 16, 2010.
International Search Report and Written Opinion from Int'l Application No. PCT/US09/043378 dated Jun. 9, 2010.
Reply to EPO Communication Pursuant to Rules 161(1) and 162 EPC from related EPC Application No. 09 747 260.9, based on PCT/US2009/043378.
International Preliminary Report on Patentability from Int'l Application No. PCT/US2009/043377 (corrected version) dated Jan. 20, 2011.
Reply to EPO Communication Pursuant to Rules 161(1) and 162 EPC from corresponding EPC Application No. 09 747 261.7, based on PCT/US2009/043381.
Reply to EPO Communication Pursuant to Rules 161(1) and 162 EPC from related EPC Application No. 09 747 259.1, based on PCT/US2009/043377.
Office Action dated Nov. 23, 2012 in German Application No. 11 2009 001 132.2-33.
Office Action received on Oct. 25, 2012 in Japanese Application No. 2011-509577.
Office Action received on Sep. 29, 2012 in Chinese Application No. 200980116969.2.
Office Action dated Oct. 30, 2012 in Application No. GB1019206.0.
Office Action dated Nov. 16, 2012 in Chinese Application No. 200980116959.9.
Office Action dated Nov. 23, 2012 in German Application No. 11 2009 001 135.7-33.
Office Action received Dec. 4, 2012 in Mexican Application No. MX/a/2010/012356.
Office Action dated Sep. 13, 2012 in Mexican Application No. MX/a/2010/012355.
Examination Report dated Sep. 25, 2012 in European Application No. 09747261.7.
Office Action dated Aug. 22, 2012 in Japanese Application No. 2011-509579.
Examiner's Report received on Aug. 15, 2012 in Australian Application No. 2009246638.
Office Action dated Sep. 15, 2012 in Japanese Application No. 2011-509578.
Examination Report dated Jul. 10, 2012 in European Application No. 09747261.7.
Examination Report dated May 21, 2012 in European Application No. 09747260.9.
Office Action received Jul. 13, 2012 in Mexican Application No. MX/a/2010/12356.
Combined Search and Examination Report dated Jul. 24, 2012 in Great Britain Application No. 1203267.8.
Examination Report dated Jul. 24, 2012 in Great Britain Application No. 1019139.3.
Office Action dated Jul. 3, 2012 in Chinese Application No. 20090116968.8.
Examiner's Report received Feb. 23, 2012 in European Application No. 09747259.1
Examiner's Report received Feb. 26, 2012 in Great Britain Application No. 1019206.0
AU; Examination Report dated May 9, 2011 in Application No. 2009246637.
GB; Examination Report dated Sep. 16, 2011 in Application No. GB1019160.9.
AU; Examination Report dated Oct. 4, 2011 in Application No. 2009246639.
DE; Office Action dated Jan. 10, 2012 in Application No. 11 2009 001 131.4-45.
AU; Examination Report dated May 10, 2011 in Application No. 2009246638.
KR; Notification of Provisional Rejection dated in Sep. 8, 2011 in Application No. 10-2010-7025551.
PCT; International Preliminary Report on Patentability dated Mar. 29, 2011 in Application No. PCT/US2009/043378.
GB; Examination Report dated Sep. 16, 2011 in Application No. GB1019139.3.
GB; Examination Report dated Jan. 11, 2012 in Application No. GB1019139.3.
USPTO; Restriction Requirement dated Dec. 2, 2016 in U.S. Appl. No. 14/632,637.
USPTO; Non-Final Office Action dated Jun. 17, 2015 in U.S. Appl. No. 14/071,417.
USPTO; Final Office Action dated Jan. 8, 2016 in U.S. Appl. No. 14/071,417.
USPTO; Advisory Action dated Mar. 24, 2016 in U.S. Appl. No. 14/071,417.
USPTO; Non-Final Office Action dated Aug. 17, 2016 in U.S. Appl. No. 14/071,417.

(56) References Cited

OTHER PUBLICATIONS

USPTO; Notice of Allowance dated Aug. 24, 2011 in U.S. Appl. No. 12/463,026.
USPTO; Notice of Allowance dated Oct. 4, 2012 in U.S. Appl. No. 12/463,016.
USPTO; Office Action dated Jan. 20, 2012 in U.S. Appl. No. 12/463,016.
USPTO; Office Action Restriction dated Oct. 11, 2011 in U.S. Appl. No. 12/463,016.
USPTO; Restriction Requirement dated Aug. 31, 2012 in U.S. Appl. No. 12/463,001.
USPTO; Non-Final Office Action dated Nov. 21, 2012 in U.S. Appl. No. 12/463,001.
USPTO; Notice of Allowance dated Mar. 5, 2013 in U.S. Appl. No. 12/463,001.
USPTO; Non-Final Office Action dated Feb. 14, 2013 in U.S. Appl. No. 13/302,084.
USPTO; Final Office Action dated May 29, 2013 in U.S. Appl. No. 13/302,084.
USPTO; Notice of Allowance dated Aug. 7, 2013 in U.S. Appl. No. 13/302,084.
PCT; International Search Report and Written Opinion dated Nov. 2, 2016 in Intl Application No. PCT/US16/45355.
USPTO; Non-Final Office Action dated Dec. 29, 2016 in U.S. Appl. No. 15/030,692.
USPTO; Restriction Requirement Office Action dated Feb. 14, 2017 in. U.S. Appl. No. 14/647,589.
USPTO; Final Office Action dated Apr. 21, 2017 in U.S. Appl. No. 14/071,417.
USPTO; Notice of Allowance dated May 1, 2017 in U.S. Appl. No. 15/030,692.
USPTO; Non-Final Office Action dated Jun. 20, 2017 in U.S. Appl. No. 14/647,589.
USPTO; Advisory Action dated Aug. 1, 2017 in U.S. Appl. No. 14/071,417.
USPTO; Non-Final Office Action dated Sep. 29, 2017 in U.S. Appl. No. 14/071,417.
USPTO; Notice of Allowance dated Apr. 12, 2018 in U.S. Appl. No. 14/647,589.
USPTO; Final Office Action dated Apr. 27, 2018 in U.S. Appl. No. 14/071,417.
USPTO; Restriction requirement Office Action dated Apr. 5, 2018 in U.S. Appl. No. 15/543,625.
Decision to Grant Pursuant to Article 97(1) EPC dated Mar. 28, 2013 from EP Application No. 09747261.7.
DE; Office Action dated Jun. 30, 2015 in Application No. 11 2009 001 131.4-45.
DE; Office Action dated Mar. 13, 2018 in Application No. 11 2009 001 131.4-45.
MX; 1st Office Action dated May 27, 2013 in Mexico Application No. 10/12354.
MX; 2nd Office Action dated Dec. 21, 2013 in Mexico Application No. 10/12354.
MX; 3rd Office Action dated Aug. 5, 2014 in Mexico Application No. 10/12354.
CN 2nd OA dated Oct. 14, 2013 in Chinese Application No. 200980116959.9.
IN First Examination Report dated Oct. 13, 2014 in Indian Application No. 4323/KOLNP/2010.
CA First Office Action dated Nov. 27, 2012 in Canadian App No. 2722714.
Canadian Notice of Allowance dated Mar. 14, 2014 in Canadian App No. 2722714.
EP Comunication pursuant to Article 94(3) EPC dated Jul. 8, 2015 in EP Application No. 09747260.9.
DE Office Action dated Apr. 12, 2018 in German Application No. 112008001135.7.
JP Notice of Allowance dated May 21, 2013 from JP Application No. 2011-509578.
CN 2nd Office Action dated Jun. 3, 2013 in Chinese Application No. 200980116968.8.
CN Third Office Action dated Dec. 23, 2013 in Chinese Application No. 200980116968.8.
First Examination Report dated Nov. 30, 2015 in India Application No. 4327/KOLNP/2010.
Exam Report in Chile Application No. 2015-01453.
International Preliminary Report on Patentability dated Dec. 21, 2017 from International Application PCT/US2016/035606.
International Search Report and Written Opinion dated Sep. 13, 2016 from corresponding International Application PCT/US2016/036506.
International Preliminary Report on Patentability dated Jul. 27, 2017 from International Application PCT/US2016/013670.
International Search Report and Written Opinion dated Jun. 9, 2016 from corresponding International Application PCT/US2016/013670.
International Preliminary Report on Patentability dated Feb. 15, 2018 from International Application PCT/US2016/45355.
Leland, J. E90: Self-Replicating Milling Machine. Blog with photos (online). Swarthmore College, 2012. (Retrieved on Jul. 31, 2013).
Dan Friedman, National Solar Technology Roadmap: Concentrator PV, Management Report NREL/MP-520-41735, Solar Energy Technologies Program, Jun. 2007, pp. 1-3.
Geoffrey S. Kinsey, et al., Multijunction Solar Cells for Dense-Array Concentrators, pp. 625-627, 2006, 1-4244-0016-3, IEEE.
David Faiman, Large-Area Concentrators, 2nd Workshop on "The path to ultra-high efficient photovoltaics," Oct. 3-4, 2002, pp. 1-8, JRC Ispra, Italy.
Anja Royne, et al., Cooling of Photovoltaic Cells Under Concentrated Illumination: A Critical Review, Solar Energy Materials & Solar Cells, 2005 (available on-line October.
Geoffrey S. Kinsey et al., Concentrator Multijunction Solar Cell Characteristics Under Variable Intensity and Temperature, Progress in Photovoltaics: Research and.
Sarah Kurtz, Opportunities and Challenges for Development of a Mature Concentrating Photovoltaic Power Industry, Technical Report NRELITP-5200-43208, June.
Ugur Ortabasi et al., Dish/Photovoltaic Cavity Converter (PVCC) System for Ultimate Solar-to-Electricity Conversion Efficiency General Concept and First Performance.
Kumer et al. "Measuring Surface slope error on precision aspheres", (2007), Proc. of SPIE vol. 6671., pp. 1-9.
Minano et al., "Free-firm optics for Fresnel-lens-based photovoltaic concentrators.", Optics Express, vol. 21, No. S3, Apr. 22, 2013, pp. A496.

\* cited by examiner

GLASS OR METAL FORMING MOLD OF ADJUSTABLE SHAPE

CROSS-REFERENCE TO RELATED APPLICATIONS

This application is a continuation in part of, claims priority to and the benefit of, PCT/US2016/20415, filed Mar. 2, 2016 and entitled "GLASS FORMING MOLD OF ADJUSTABLE SHAPE." The '415 application claims priority to and the benefit of U.S. Provisional Application No. 62/127,178 filed Mar. 2, 2015 and entitled "GLASS SAGGING MOLD OF ADJUSTABLE SHAPE," both which are hereby incorporated by reference in their entirety for all purposes.

FEDERALLY SPONSORED RESEARCH OR DEVELOPMENT

This invention was made with government support under Grant No. DE-EE0005796, awarded by DOE. The government has certain rights in the invention.

FIELD

The present disclosure relates to solar collectors, and more particularly, to molds for creating solar collecting mirrors. More generally, it relates to shaped reflector panels.

BACKGROUND

Shaped glass sheets are often used as solar concentrating mirrors. Back-silvered shaped glass mirrors are preferred for this use, as they are proven to maintain high reflectivity in field operation, over many years of exposure. They are also mechanically stable, holding their shape also over many years, with little yielding or fatigue.

In the past, nearly all curved solar concentrating mirrors have been shaped by rollers after heating and softening. However, this method may be limited in its shape accuracy, typically to >1.5 mrad rms slope error, and may be limited to shapes that are cylindrical or nearly cylindrical, i.e. curved mostly in one dimension and used to concentrate sunlight to a line focus.

In the past, most curved glass solar concentrating mirrors forming a point focus were made by sagging into a rigid, dish-shaped, steel mold, for example, in U.S. Pat. No. 8,082,755, to Angel and Olbert. High accuracy has been demonstrated by this method (<1 mrad rms slope error). However, high accuracy shaping may sometimes involve a mold made by machining and refiguring of the machined mold surface to improve fine scale surface accuracy, which can be time-consuming in some applications. If the replica is formed when neither the sheet or panel, nor the mold is in thermal equilibrium, then the replica shape may deviate from that of the mold. The mold shape may need to be altered to improve larger scale surface errors. Furthermore, large rigid molds may need to be thick to hold their shape accuracy, and as a result, can have high thermal inertia, which makes it difficult to rapidly heat a mold having high thermal inertia without exacerbating the distortion from thermal gradients. As a result, processing cycle times may be slowed.

In the past, the industry has used solar reflectors curved to very few different shapes, because the manufacturing methods require retooling for different shapes, an expensive and time consuming process. This has inhibited development of new concentrator applications which require unusual shapes, or those that benefit from use of a mosaic of many different replica shapes.

In addition, shaped metal panels are often used to make large diameter microwave antennae. Typically such an antenna dish will be fabricated from panel segments of many different shapes. Such panels may be difficult and expensive to manufacture, each differently shaped panel being replicated from a mold of different shape. Furthermore, a panel in an antenna operated in the shorter wavelengths of the microwave range, around 1 cm or less, may require backing with a stiffened structure to hold its shape to the required accuracy. In the past, each panel of different shape has required a differently shaped backing structure, further driving up the cost of manufacture.

SUMMARY OF THE INVENTION

A system for forming glass or metal sheets or panels may comprise an oven comprising an insulated perimeter; a molding surface located within an interior of the oven; a plurality of coupling elements in a two-dimensional array configured to adjust a shape of the molding surface, wherein the plurality of coupling elements extend through the insulated perimeter, wherein the shape of the molding surface is configured to define a shape of a glass or metal sheet or panel heated within the oven; and a plurality of position actuators coupled to the plurality of coupling elements, wherein the plurality of position actuators are located exterior of the oven.

In various embodiments, the molding surface may comprise a plurality of contact segments. The plurality of contact segments may be hexagonal. The system may comprise a positioning plate associated with each contact segment, wherein the positioning plate is movable by position actuators, wherein the positioning plate is located external to the oven, and an insulating block positioned between a contact segment in the plurality of contact segments and its associated positioning plate. A rigid reference structure may be external to the oven, wherein the rigid reference structure supports fixed ends of the position actuators. A plurality of blades may be coupled to the contact segment and its associated positioning plate, wherein the plurality of blades form the coupling element. A first plurality of cooling jets may be configured to direct cooling air to the molding surface, and a second plurality of cooling jets may be configured to direct cooling air to a shaped glass or metal sheet or panel in contact with the molding surface. Each contact segment may comprise a quartz tube having a rounded end, and the rounded ends of the plurality of contact segments may form the molding surface. A cooling jet may be located at least partially within an interior of the contact segment. The molding surface may comprise a metal sheet, wherein the metal sheet comprises a plurality of slits configured to increase a flexibility of the metal sheet.

A method of shaping a glass or metal sheet or panel may comprise adjusting a two-dimensional array of coupling elements to shape a molding surface for a given mold shape, wherein the coupling elements extend through a perimeter of an oven; positioning a glass or metal sheet or panel above the molding surface; heating the glass or metal sheet or panel which may be initially flat; causing the glass or metal sheet or panel to deform and contact the molding surface; and cooling the glass or metal sheet or panel.

In various embodiments, the method may include measuring a shape of the sheet or panel; adjusting at least one of the coupling elements to modify a shape of the molding surface; and shaping a new glass or metal sheet or panel using the molding surface, wherein the shaping the new sheet or panel comprises: positioning the new sheets or panels above the molding surface; heating the new sheet or panel; causing the new sheet or panel to deform and contact the molding surface; and cooling the new sheet or panel. The molding surface may be coupled to position actuators located exterior to the oven via the coupling elements, wherein the oven is configured to heat the sheet or panel. The sheet or panel may be cooled with cooling jets, wherein the cooling jets pass through an interior of coupling elements. The coupling elements may be iteratively adjusted until a desired mold shape is achieved. A plurality of replica sheets or panels may be shaped without further adjusting the coupling elements.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
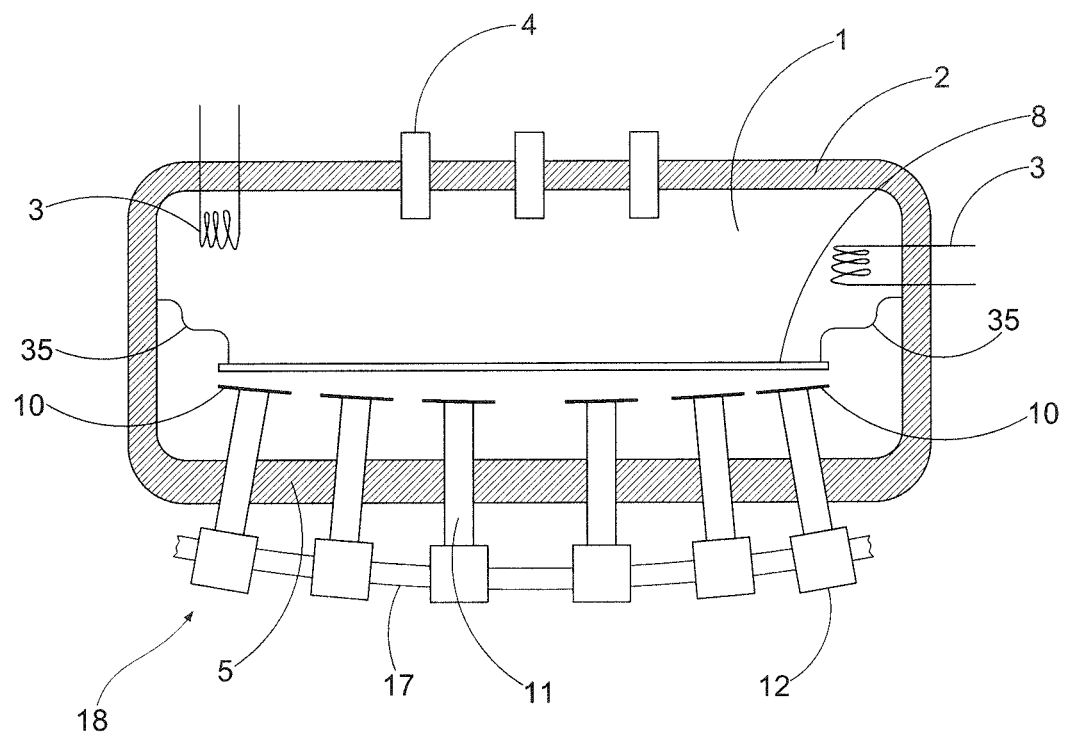
FIG. 1A illustrates a schematic diagram of an oven and adjustable shape mold with a piece of flat glass or metal prior to shaping, in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure relates to a glass or metal forming mold of adjustable shape, used to form glass or metal sheets or panels into a given curved shape. The same mold may be readjusted to form different given shapes if desired. In various embodiments, the adjustable mold parts that form the hot molding surface are constructed with minimum of mass and thermal inertia. Such construction speeds manufacture by minimizing the thermal cycle time needed to soften and shape each sheet or panel of glass or metal, and makes possible tempering of the softened, shaped glass or metal by rapid cooling from below as well as from above. The softened glass or metal may be formed by sagging under the force of gravity alone, or with the addition of air pressure.

Adjustments of the mold shape may be made with reference to the shape of a test replica made from the mold. If shape measurements of the cooled replica show errors compared to the desired shape, then the mold may be adjusted to reduce these errors, and a new test replica may be formed using the same or modified thermal cycle. This sequence may be iteratively repeated until the replica has the desired shape for a given thermal cycle and actuator settings. Additional replicas may then be formed with the same thermal cycle to have the same shape, and no further adjustment may be needed. If errors develop subsequently, these may be corrected by further mold adjustments.

In various embodiments, a mold may comprise an array of molding surface elements, individually orientable in tip, tilt and height, and adjusted so as to yield a nearly continuous molding surface. The orienting mechanisms may be external to the heated region of the heating oven. The mechanisms may each include a kinematically mounted support plate, operated by three micrometers. The molding surface elements located within the heated part of the forming oven may be rigidly attached to the external orienting mechanisms by thin blades of steel that pass through the insulated base of the oven.

Softening of the glass or metal may be accomplished by heating, in various embodiments by radiative heating from above. Thermal radiation at a higher temperature than the glass or metal may be absorbed in part (the longer wavelengths) by the glass or metal. The shorter wavelengths transmitted by the glass or metal may be absorbed by the molding surface elements, which are thus also heated. The thermal inertia of the molding surface elements may be chosen to be comparable to or less than that of the glass or metal to be shaped, so that the time to heat and soften the glass or metal in proximity to the mold is not much longer than the lower limit set by the thermal inertia of the glass or metal alone.

In various embodiments, the mold may comprise an array of fused quartz tubes, whose tips define the shape of the formed glass or metal. Each tube may pass through the insulated mold, and may be actuated from below by a micrometer screw. To decrease or prevent quilting of the replica caused by local sagging over an individual tube end, cold air may be blown through the tube to freeze the glass or metal locally.

In various embodiments, the molding surface takes the form of a largely continuous sheet whose shape is adjusted by an array of rods actuated from below. The rods may be positioned approximately perpendicular to the mold surface such that that thermal expansion of the continuous sheet does not cause significant shape distortion.

In any of these embodiments, the mold may be provided with a multiplicity of air jets to temper the glass or metal by rapid cooling after the shaping. The jets may act to cool both on the upper glass or metal surface from above, and the lower glass or metal surface and the molding surface from below.

The molds described herein may be utilized to form glass or metal sheets or panels in different shapes, adjustable across their full area. The molds may form glass or metal replicas which will reflect light to a point or line focus or to other optical prescriptions, according to the intended use.

The molds may provide for correction of the two-dimensional shape of the mold, so that glass or metal shaped by the mold takes on accurately the desired shape, even when this shape is not precisely that of the cold mold, because of distortions in two dimensions caused by thermal gradients in a rapid shaping cycle.

The shape of the mold may be referenced to a rigid structure whose shape is independent of the heating used to soften the glass or metal for shaping.

The glass or metal shaping molds may have a minimum of mass and thermal inertia, so that a minimum amount of energy is consumed in heating each mold when a glass or metal sheet is heated to the deformation temperature of the glass or metal for forming against the upper surface of the mold.

The molds may have low thermal inertia with an open as well as lightweight structure so as to make possible rapid cooling of the glass or metal from below as well as from above, as required for tempering.

The force used to bring the softened glass or metal against the mold may be either from gravity alone, in a gravity sagging process, or with additional force from air pressure applied to the upper surface of the softened glass or metal.

In various embodiments, the panels prior to shaping may be simply flat sheets of glass or metal, or they may comprise flat or curved facesheets with stiffening backing structure, attached for example by fusion or welding. After heating, the softened facesheet conforms to the adjusted mold shape and the softened backing structure also adjusts its shape to conform to the new shape of the sheet. Then on cooling, the backing structure so shaped provides stiffness to hold the sheet rigidly to the molded shape.

Figure 1B:
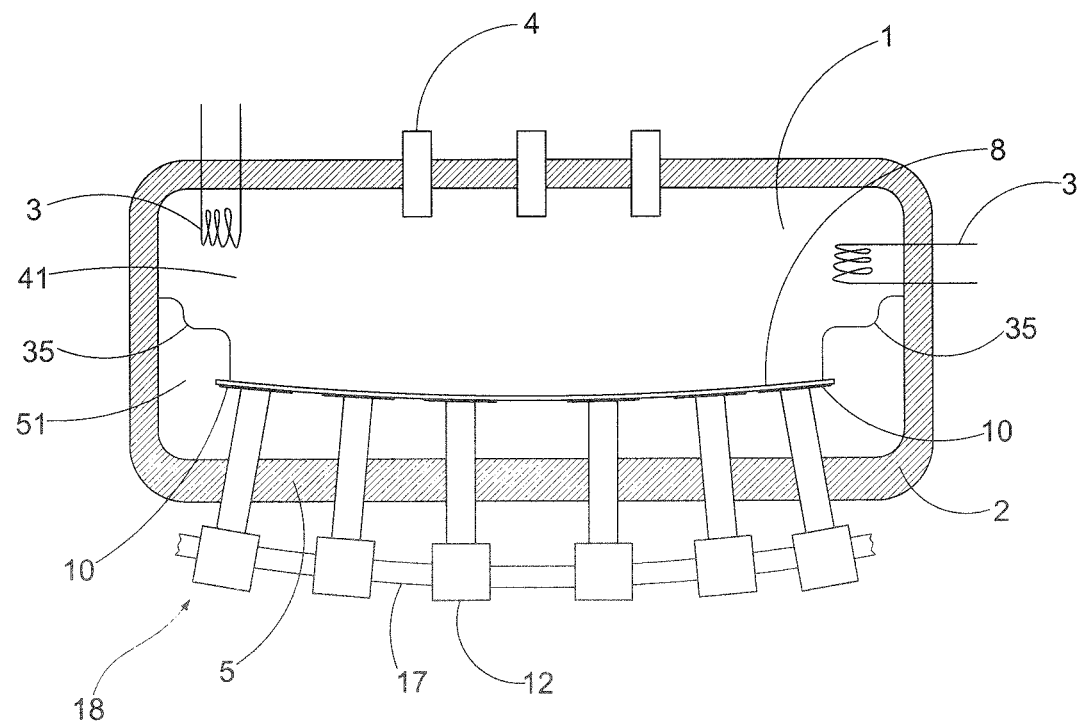
FIG. 1B illustrates a schematic diagram of an oven and adjustable shape mold after the sheet has softened and taken on the shape of the mold, in accordance with various embodiments.

Referring FIGS. 1A and 1B, a schematic view of an oven and adjustable mold 18 is illustrated according to various embodiments. FIG. 1A illustrates this system with a sheet 8 before shaping, and FIG. 1B illustrates the system after the sheet 8 has deformed by gravity sagging or sagging and increased pressure to the shape of the upper surface of the adjustable mold 18. In various embodiments, the sheet 8 may be a glass sheet or a metal sheet. The adjustable mold 18 may be constructed so as to form part of the insulated perimeter 2 of an enclosed volume 1 in which a sheet 8 is heated and softened. Heating of the enclosed volume 1 may be by electric elements 3, and the glass or metal temperature may be measured by infrared thermometers 4. A seal 35, which may be flexible, connecting the edge of the sheet 8 to the insulated perimeter 2 may be provided to separate the enclosed volume 1 into an upper region 41 above the seal 35, and a lower region 51 below the seal 35. Increased pressure in the upper region 41 may be applied when the sheet 8 is softened to accelerate the forming process.

The adjustable mold 18 may comprise contact segments 10 of the mold that touch the sheet 8 after sagging and define its sagged shape. The contact segments 10 may together form a molding surface configured to shape the sheet 8. These contact segments 10 are internal to the enclosed volume 1 and are heated along with the sheet 8. The adjustable mold 18 may comprise position actuators 12 which are external to the heated volume and remain cold. Coupling elements 11 may link the contact segments 10 to the position actuators 12, allowing adjustment of the mold shape from outside of the oven. The adjustable mold 18 may comprise thermal insulation 5 located between the contact segments 10 and the position actuators 12 that completes the insulated perimeter 2 across the mold while providing for penetration of the coupling elements 11. A rigid mold support plate 17 may support the position actuators 12.

Figure 2:
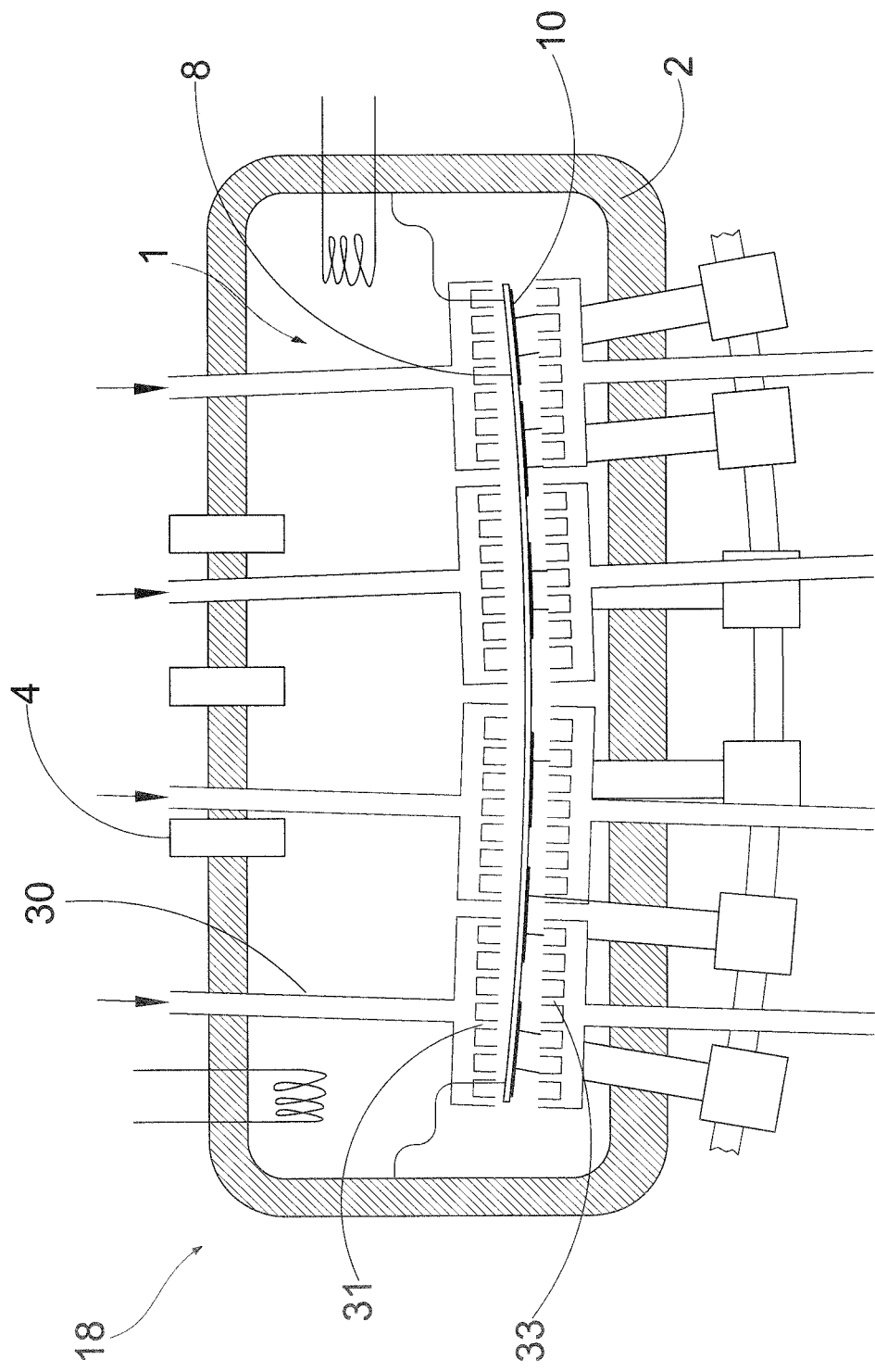
FIG. 2 illustrates a schematic diagram of an oven and adjustable shape mold with cooling jets, in accordance with various embodiments.

Referring to FIG. 2, a schematic view of the adjustable mold 18 with air jets 31, 33 is illustrated according to various embodiments. The sheet 8 may be tempered by rapid surface cooling. Air jets 31, 33 may be configured to direct relatively cold air across the upper and lower faces of the sheet 8. The air may be introduced through the insulated perimeter 2 by ducts 30. The air jets 31 to cool the upper surface may be moved into position after the sheet 8 has conformed to the mold. Rapid cooling of the lower surface is possible because the contact segments 10 are lightweight and have low thermal inertia.

Figure 3:
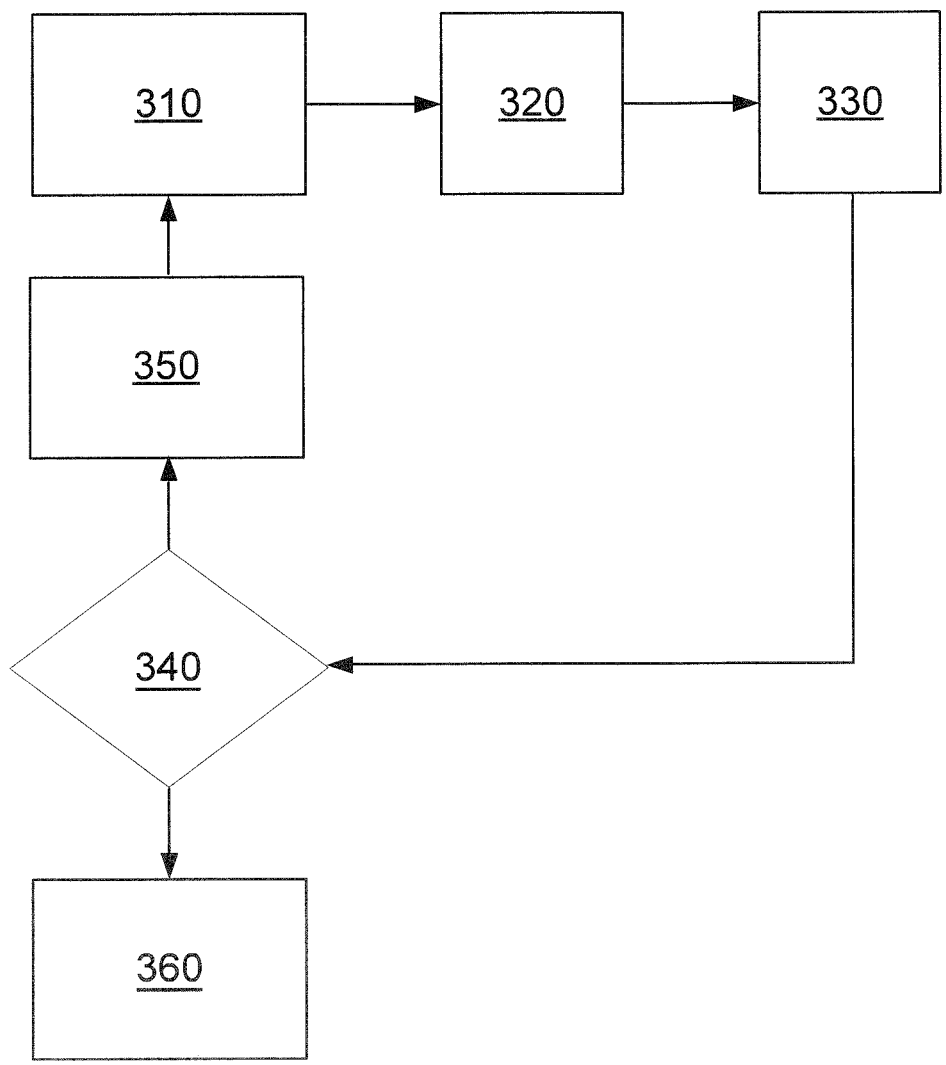
FIG. 3 illustrates a flow chart showing a mold shape correction cycle, in accordance with various embodiments.

Referring to FIG. 3, a flowchart of a method of adjusting an adjustable mold is illustrated according to various embodiments. The actuators are operated to bring the surface elements of the mold to the approximate desired shape of the molded part. A test sheet may be placed adjacent to a surface of the adjustable mold (step 310). The test sheet may be formed against the adjustable mold according to a prescribed thermal cycle (step 320). After cooling, the test sheet is removed, and its shape may be measured by mechanical or optical metrology (step 330). Any shape errors may be determined (step 340). If the test sheet is not within desired specifications, the adjustable mold shape may be adjusted so as to reduce the errors (step 350), and a new test sheet may be introduced (step 310). The adjustments may be completed by motorized drives operated under computer control. This cycle may be repeated until the processed piece meets the shape specification. The adjustable mold is now ready for manufacture of multiple replicas of the same shape, with limited or no further adjustment (step 360). Metrology measurements may be continued during replica production, so that any long term changes in the replicated shape may be corrected by mold adjustments as needed.

Figure 4:
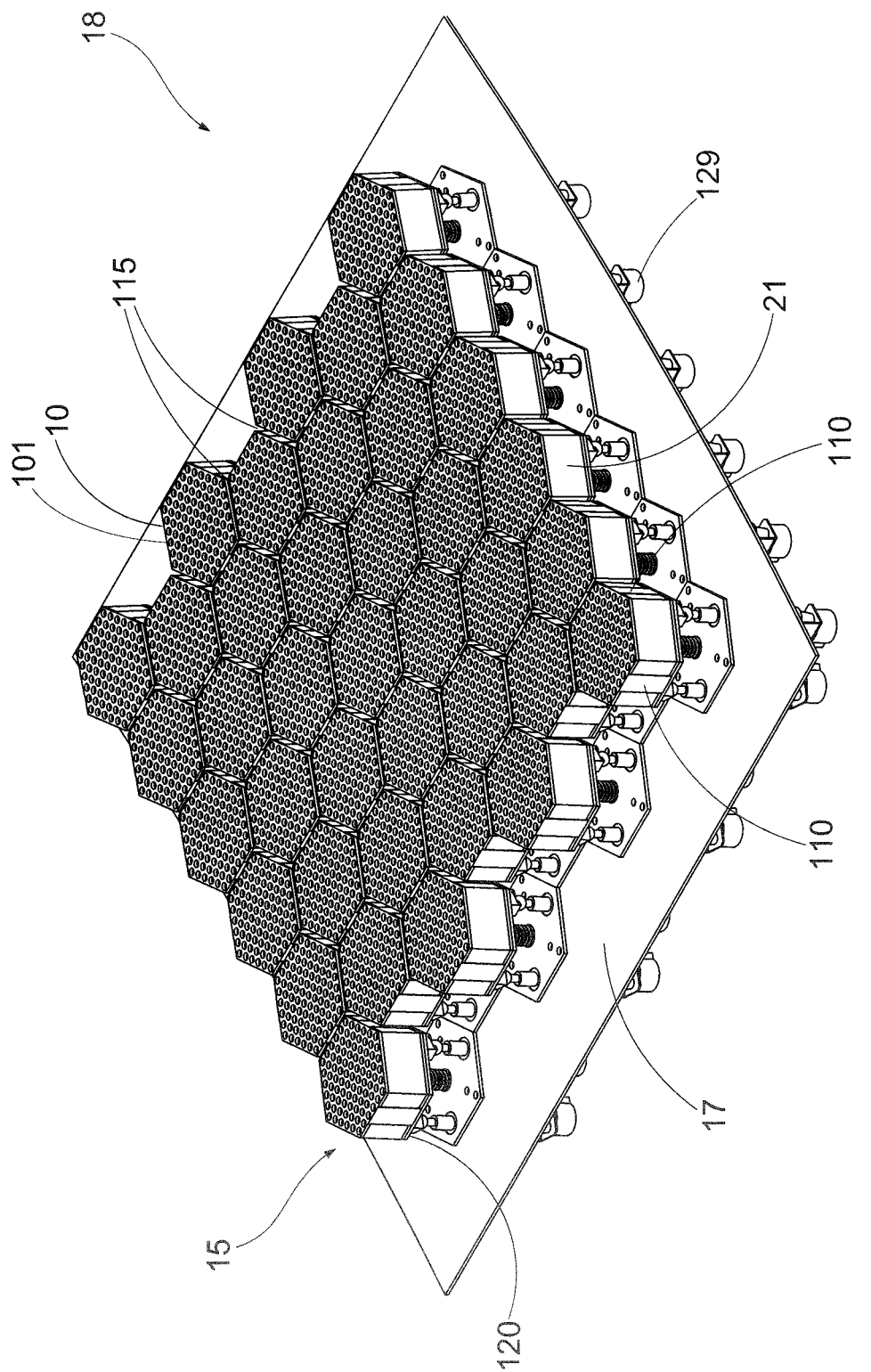
FIG. 4 illustrates a perspective view of a mold comprising a plurality of molding segments, in accordance with various embodiments.

Referring to FIG. 4, a perspective view of an adjustable mold 18 comprising a plurality of contact segments 10 is illustrated according to various embodiments. The contact segments 10 onto which the glass or metal sheet is formed may be hexagons of an oxidization resistant material such as stainless steel, which may be perforated with holes 101. The shape of a glass or metal sheet when sagged onto the adjustable mold 18 is determined locally by the shape of the surface of the contact segments 10, which is made with the desired shape by, for example, machining or lapping. Globally, the mold shape may be determined by the positioning of the contact segments 10 with respect to each other. The contact segments 10 may be separated by gaps 115. Both the holes 101 and the gaps 115 may be made narrow enough so that the glass or metal does not significantly droop into them during the sag-forming process. FIG. 4 illustrates an adjustable mold 18 formed from 39 contact segments 10, but it will be apparent to those skilled in the art that the number and size of the contact segments 10 can be made as large or as small as desired to obtain the desired mold size and shape. It should be apparent to those familiar with the art that segmentation of the adjustable mold 18 may be made with any number of different shaped elements, the regular array of hexagons as illustrated being simply one example.

The position and orientation of each contact segment 10 is determined by that of a positioning plate 120. In various embodiments, the positioning plate 120 may be a cold, hexagonal positioning plate. The contact segments 10 and positioning plates 120 may be rigidly connected together by three blades 110. The space between the contact segments 10 and the positioning plates 120 may be filled with an insulating block 21, such as aluminosilicate fiber board, that provides thermal insulation. The contact segments 10 may be coupled to a mold support plate 17 which may be curved to hold the contact segments 10 in a shape approximating the desired shape of the molding surface, as further described herein.

Figure 5:
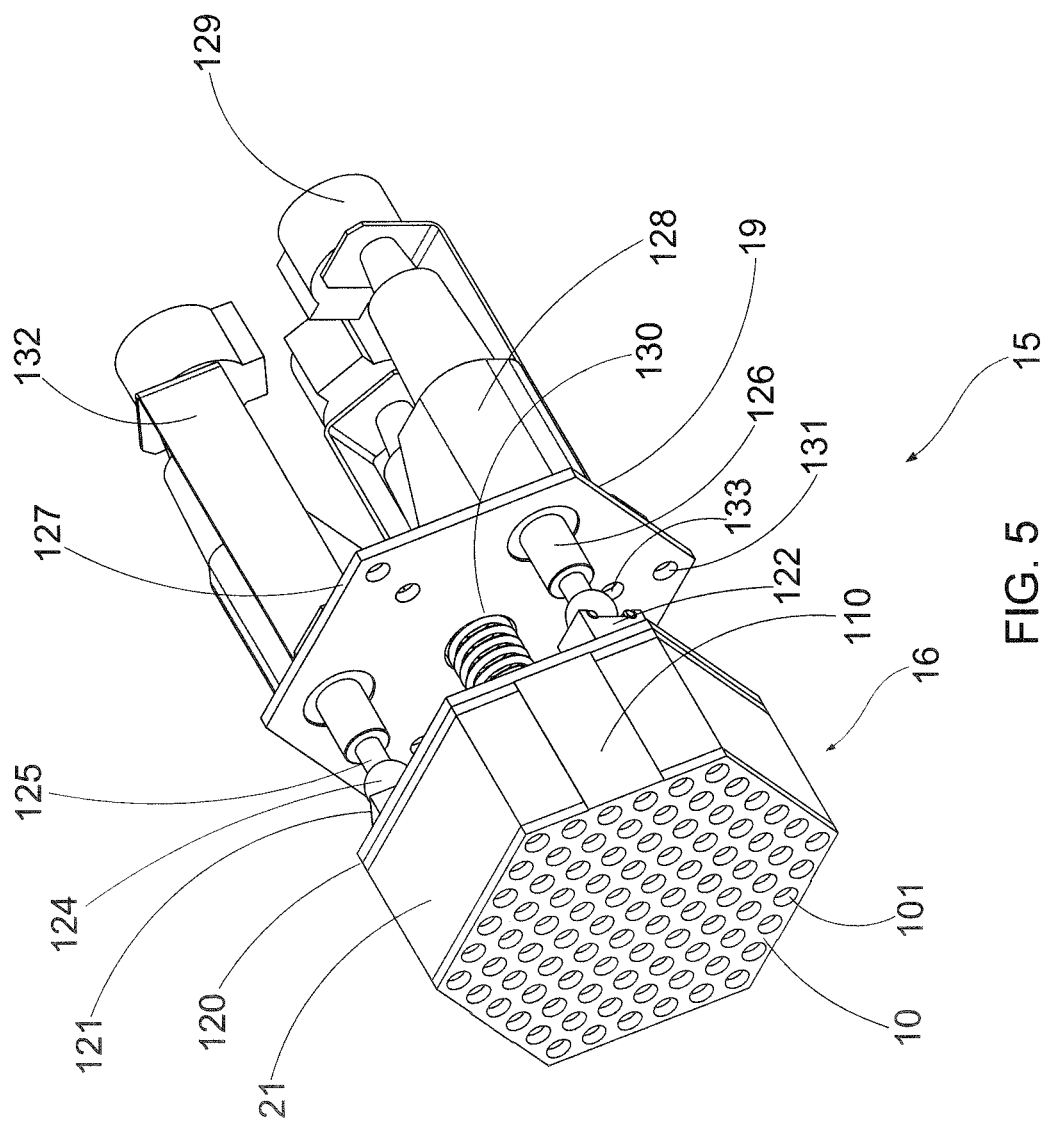
FIG. 5 illustrates a cross sectional view showing a detail of the mounting and adjustment of a hexagonal mold segment, in accordance with various embodiments.
Figure 6:
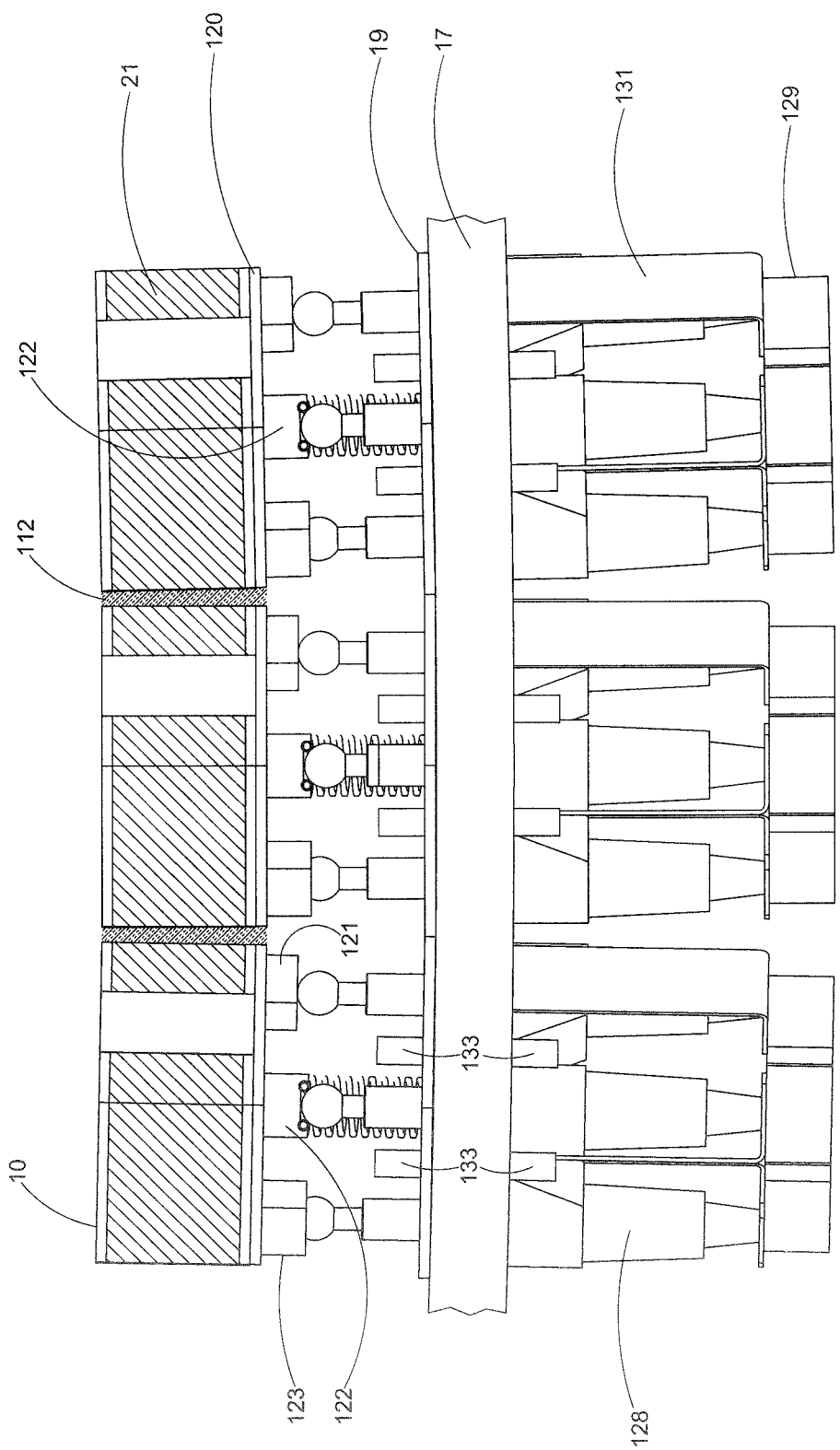
FIG. 6 illustrates a perspective view showing details of the mounting of mold actuator subassemblies, in accordance with various embodiments.

Referring to FIG. 5 and FIG. 6, FIG. 5 illustrates a perspective view of a mold subassembly 15, and FIG. 6 illustrates a cross-section view of three mold subassemblies 15 according to various embodiments. The unit comprising a contact segment 10, an insulating block 21, a positioning plate 120 and three blades 110 together form a surface subassembly 16, which is integrated with actuators and a mounting plate into a mold subassembly 15. The adjustable mold 18 may be formed by attachment of mold subassemblies 15 in an array to a mold support plate 17 which may be curved to hold the contact segments 10 in a shape approximating the desired shape of the molding surface.

FIG. 5 shows in detail a complete mold subassembly 15, prior to attachment to the mold support plate 17. The positioning plate 120 which is rigidly connected to the contact segment 10 may be adjusted in tip, tilt and height by three micrometers 128 whose extending micrometer shafts 125 terminate in spherical ball ends 124. The spherical ball ends 124 engage with cone 123, groove 122 or flat 121 elements attached to the positioning plate 120 to form a kinematic mount. In various embodiments, the ball ends engage in three radial grooves 122 cut into the positioning plate 120. The three micrometers 128 are supported via their mounting flanges 126 to a mounting plate 19. The mounting plate 19 provides also the fastening points 131 for each complete subassembly 15 to be attached to the overall mold support plate 17. A tensioning spring 130 is connected between the center of the positioning plate 120 and a mounting plate 19, acting to hold the kinematic mount in compression. The tip, tilt and height of the positioning plate 120 are set by advancing or retracting the three micrometers 128, preferably by means of three drive motors 129. The motors are supported from the mounting plate 19 by brackets 132. In various embodiments, each drive motor 129 or each micrometer shaft 125 may be provided with an encoder which may be read remotely by a control computer. The drive motors 129 may then be operated to make specific correction strokes, as described with reference to step 350 in FIG. 3.

In operation, when a contact segment 10 is heated it expands, while the positioning plate 120, which remains cold, does not. The blades 110 flex to accommodate this expansion while maintaining centration of the contact segment 10 relative to the positioning plate 120. The blades 110 conduct heat from the contact segment 10 to the positioning plate 120. This heat flow is minimized by keeping the blades thin. Because the blades 110 become heated when the contact segment 10 is hot, they expand, and increase slightly the separation of the positioning plate 120 and the contact segment 10. In order for the positioning of the contact segment 10 to be accurately reproducible from one sag replication to the next, the thermal expansion of the blades 110 may be reproducible, and thus also their average temperature. To minimize changes in thermal coupling, the blades 110 may be insulated by insertion of insulating ceramic fiber 112 in the gaps between the subassemblies, as shown in FIG. 6.

Heat conducted from the contact segments 10 through the insulating block 21 and through the blades 110 to the support positioning plate 120 may be transferred out of the mold by circulation of coolant behind the positioning plate 120. A plurality of nozzles 133 in the mounting plate 19 may jet cold air onto the positioning plate 120 for this purpose. However, it will be understood by those familiar with the art that other configurations may be used to cool the positioning plate 120, with other coolants such as water, and that these are included within the scope of this invention.

Figure 7:
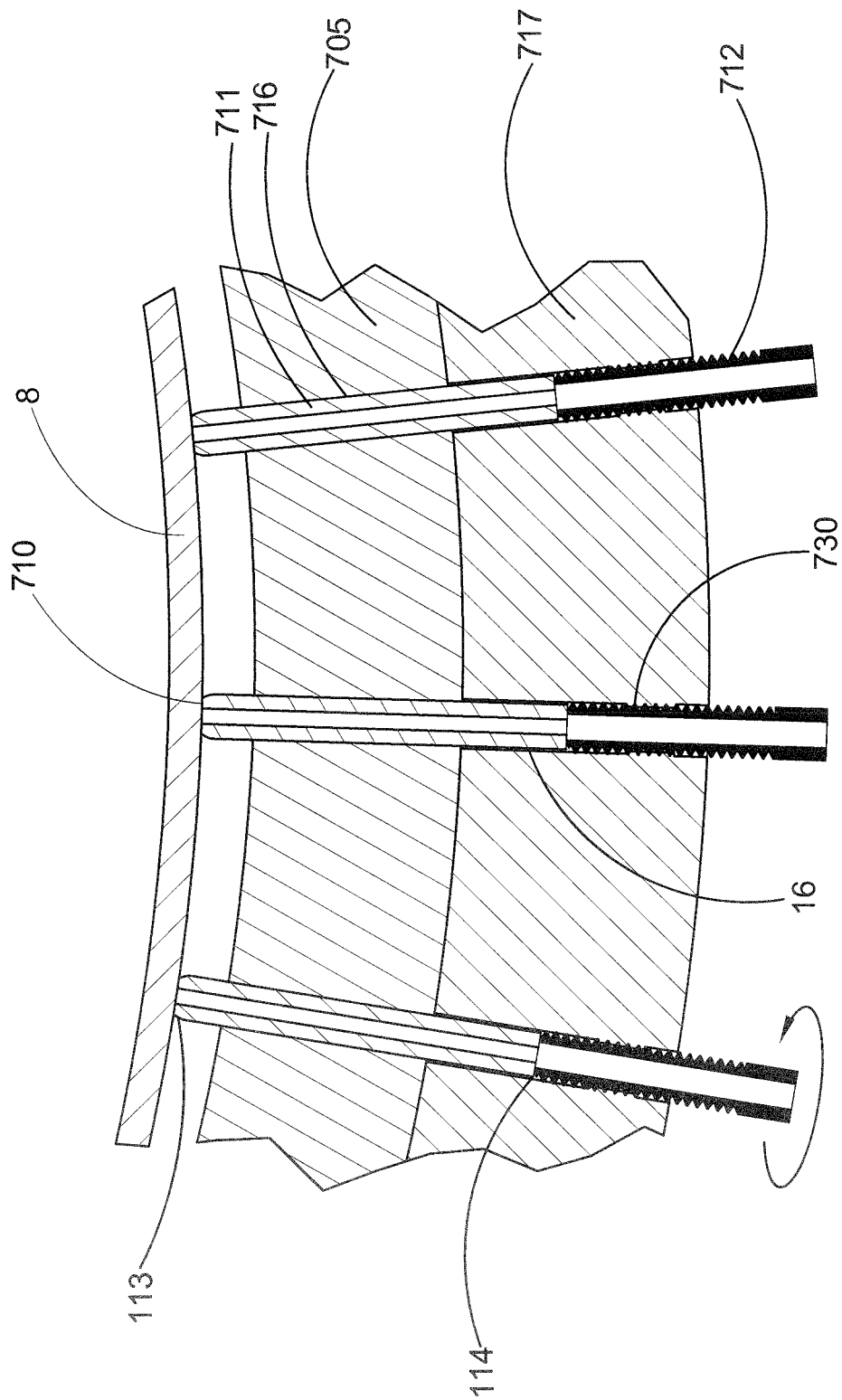
FIG. 7 illustrates a view of an adjustable mold comprising an array of contact rods, in accordance with various embodiments.

Referring to FIG. 7, a schematic view of a portion of an adjustable mold 718 comprising an array of contact segments 710 in the form of tubes 711 is illustrated according to various embodiments. The contact segments 710 of the mold that are contacted by the sheet 8 after sagging may comprise a two-dimensional array of tubes 711. The contact segments 710 may together form the molding surface where the contact segments 710 contact the sheet 8. In various embodiments, the tubes 711 may be hollow and cylindrical. The tubes 711 may comprise a material with low thermal expansion and low thermal conductivity, such as fused quartz. Each tube 711 has a first end 113 and a second end 114. The first ends 113 may be rounded and contact the sheet 8 and define its shape. The second ends 114 may be in contact with coupling elements 712. The coupling elements 712 may comprise threaded hollow adjustment tubes, and may be raised and lowered by rotation of the coupling elements 712 within threaded holes 730 in the mold support plate 717. Such rotation may be made manually, or preferably by a motor drive, not shown, operated with an encoder in closed loop servo control. The tubes 711 may be constrained to move along their axis by close fitting holes 16 bored in a cooled mold support plate 717. The tubes 711 also pass through holes 716 in a layer of thermal insulation 705 that extends across the mold support plate 17. In order to ensure that the second ends 114 of the tubes remain in contact with the coupling elements 712, a tension wire may be attached to the inner wall of the tube 711 and pass down through the coupling element 712 to a tensioning spring attached further down in the coupling element 712.

As part of the sagging process, when the softened sheet 8 makes local contact with the first end 113 of the tubes 711, cold air may be blown up through the coupling elements 712 and the tube 711 to freeze the sheet 8 locally. This cooling largely prevents further local sagging of the sheet 8 around the first end 113 of the tube 711, which would result in a quilted replica surface. The first ends 113 of the tubes 711 may be grooved in order to allow cooling air flow after glass or metal contact.

In various embodiments, the tubes 711 may be arrayed across the face of the adjustable mold 18 in an array of equilateral triangles. This pattern minimizes the amplitude of quilting. The spacing between the tubes 711 may depend on the thickness of the sheet 8 being sagged, and the shape of the sheet 8 to be formed by the sagging process. More specifically, if the shape to be formed is deeply curved in two dimensions, hoop strains in the sheet 8 may be large, requiring significant stretching or compression of the sheet 8. In this case, reduced glass or metal viscosity may be desired, and spacing of the tubes 711 as close as a few times the glass or metal thickness may be desired to keep quilting amplitude to an acceptable level. On the other hand, if only slight bending of initially flat glass or metal sheets is required, by an amount comparable to the elastic bending of the glass or metal sheet under gravity, then the glass or metal may relax enough to take on permanently the mold shape while still being very stiff. In such a case, the tubes 711 may be spaced at distances as much as 10-30 times the glass or metal thickness.

Figure 8:
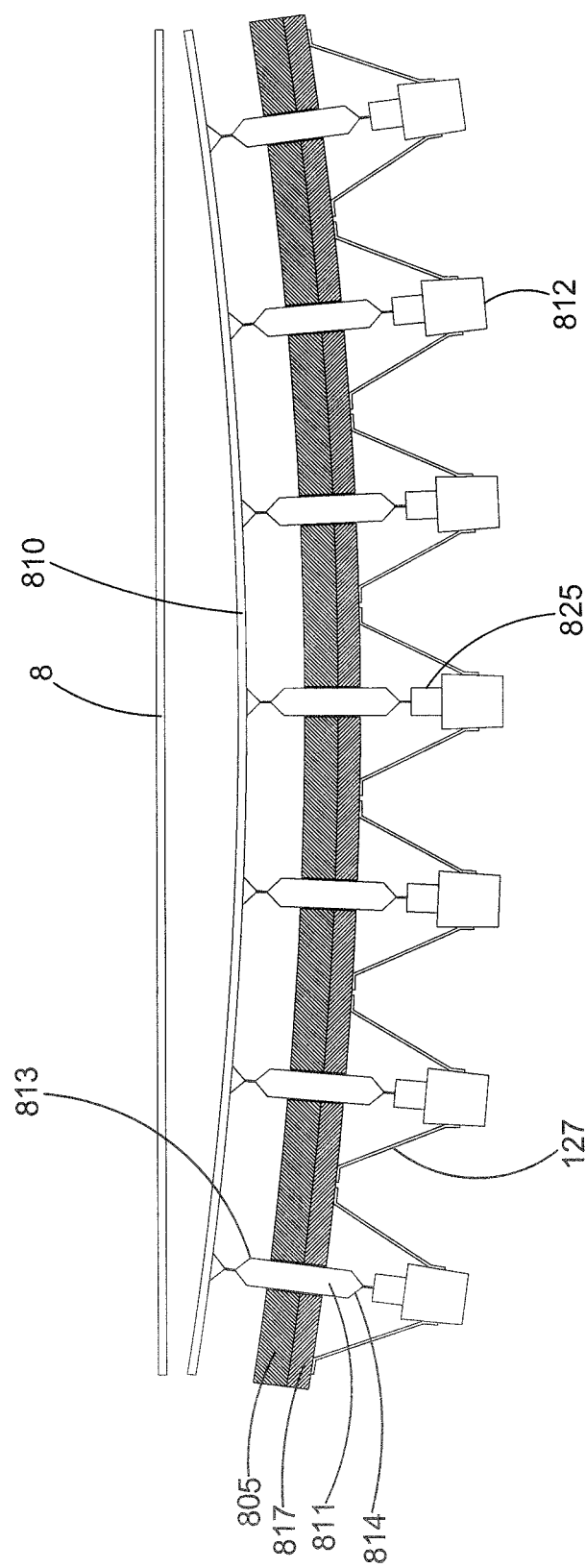
FIG. 8 illustrates a view of an adjustable mold made with a single piece contact plate, in accordance with various embodiments.

Referring to FIG. 8, the molding surface onto which the sheet 8 is to be formed may be a continuous molding sheet 810 whose shape is adjusted from below by a two dimensional array of height control rods 811 (also referred to as coupling elements 811). The first ends 813 of the height control rods 811 may be attached to the molding sheet 810 while the second ends 814 of the rods may be attached to actuator shafts 825 of the position actuators 812, which provide for adjustment of the molding sheet 810. The rod is also preferably made long to minimize geometric errors, and is preferably made of low expansion material to minimize sensitivity of the molding sheet 810 to changes in the thermal environment. The position actuators 12 may be attached to the mold support plate 817 by brackets 127.

Figure 9:
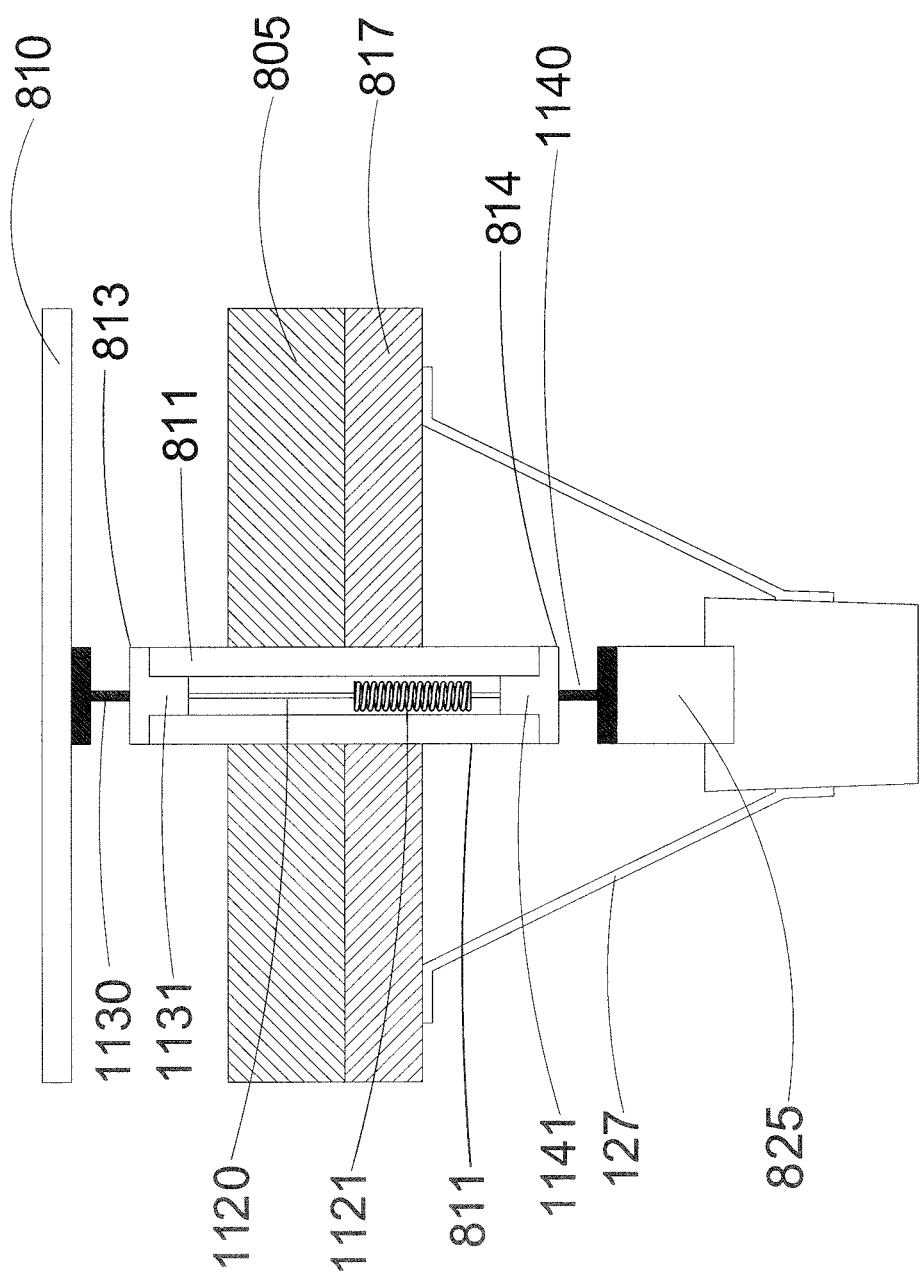
FIG. 9 illustrates details of an actuator for a continuous mold plate, in accordance with various embodiments.

Referring to FIG. 9, a cross-section view of a position actuator 812 and a height control rod 811 is illustrated according to various embodiments. The height control rod 811 may be fitted with a first plug 1131 at the first end 113 and a second plug 1141 at the second end 814. The plugs 1131, 1141 may be held tightly against the ends of the height control rod 811 by an internal tension wire 1120 and a spring 1121, which may be near the cold, second end 814. The first end plug is attached to the molding sheet 810 by a first flexure 1130. The first flexure 1130 may take the form of a thin blade oriented tangential to the center of the molding sheet 810. The second end 114 may be attached to the actuator shaft 825 by a second flexure 1140. The second flexure 1140 also may take the form of a thin blade also oriented tangential to the center of the molding sheet 810. The flexures thus implemented allow for radial thermal expansion of the mold plate on heating—such expansion is accommodated by the rods leaning radially outwards. The geometry is preferably chosen such that when the mold sheet is at glass or metal forming temperature and has expanded in size, the rods 111 are locally perpendicular to the molding sheet 810, so that slight errors in geometry that change the rod angle do not translate to significant errors in the molding surface.

Figure 10:
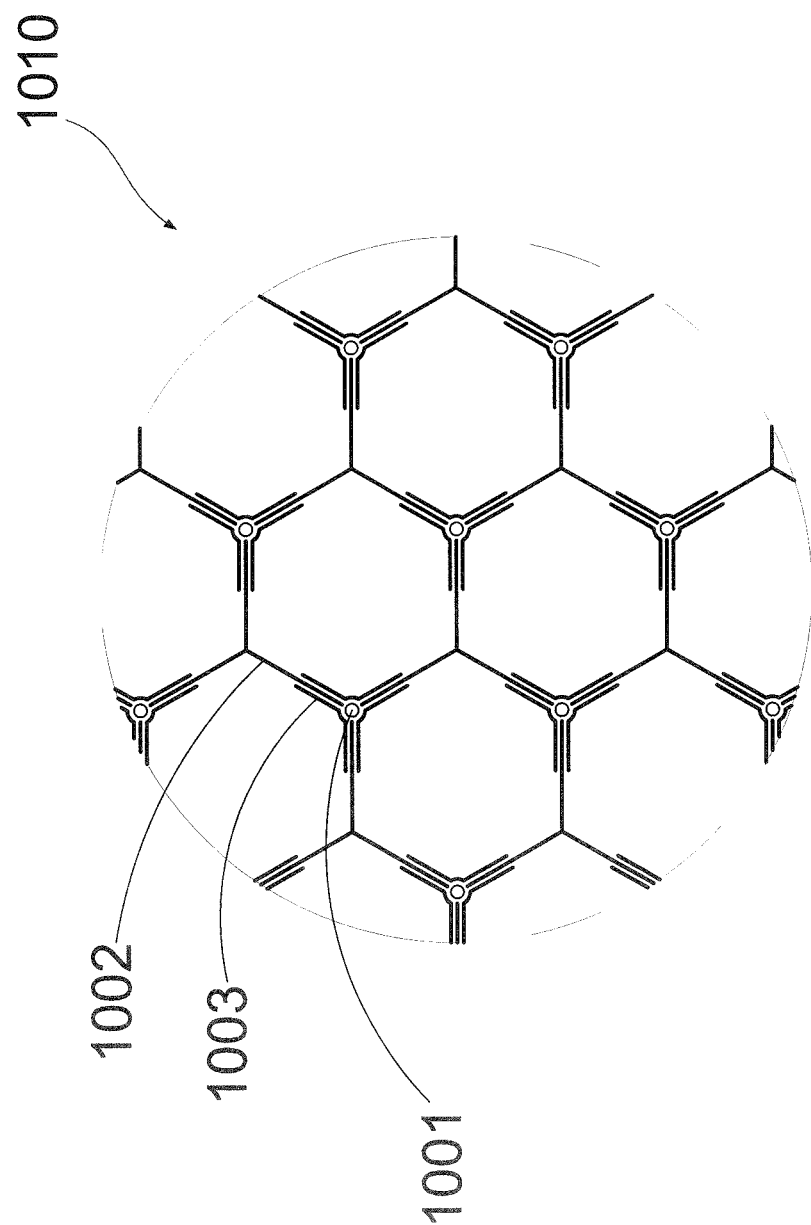
FIG. 10 illustrates a plan view showing part of a continuous mold plate with a pattern of cut slits, in accordance with various embodiments.

Referring to FIG. 10, a plan view of a continuous molding sheet 1010 cut so as to reduce shell stiffness, and more easily allow for shape adjustment is illustrated according to various embodiments. The cuts of Y shape 1002 and V shape 1003 may be made by water or plasma jet. The cuts leave the molding sheet 1010 continuous, but effectively divide it into hexagons which are each connected to their neighbors at three nodes 1001, by hairpins. Bending of the hairpins allows for the hexagons to be spread apart or moved closer together, to accommodate hoop strain. The first end flexures in this case may be attached to the molding sheet 1010 at the nodes 1001.

Figure 11A:
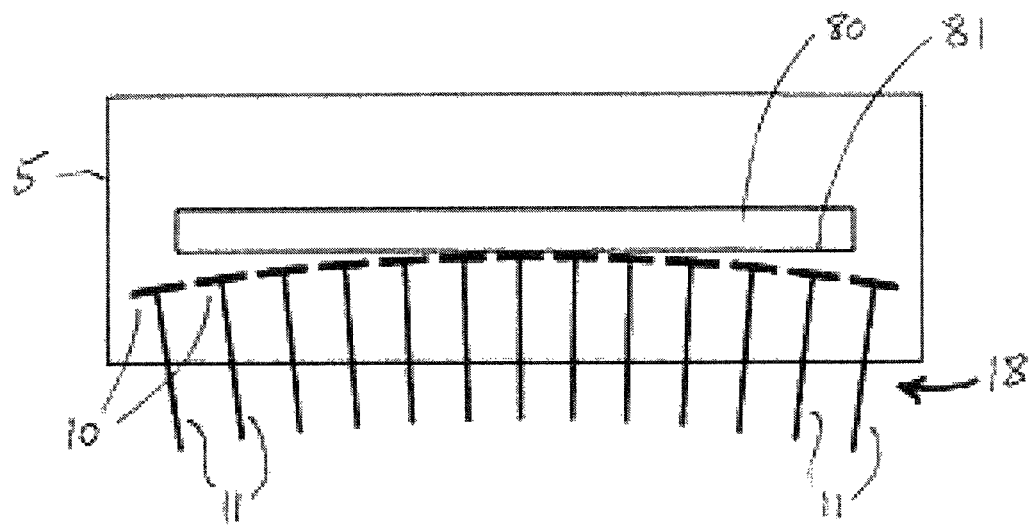
FIG. 11A illustrates a schematic diagram of a ribbed panel prior to shaping resting on an adjustable shape mold, in accordance with various embodiments.
Figure 11B:
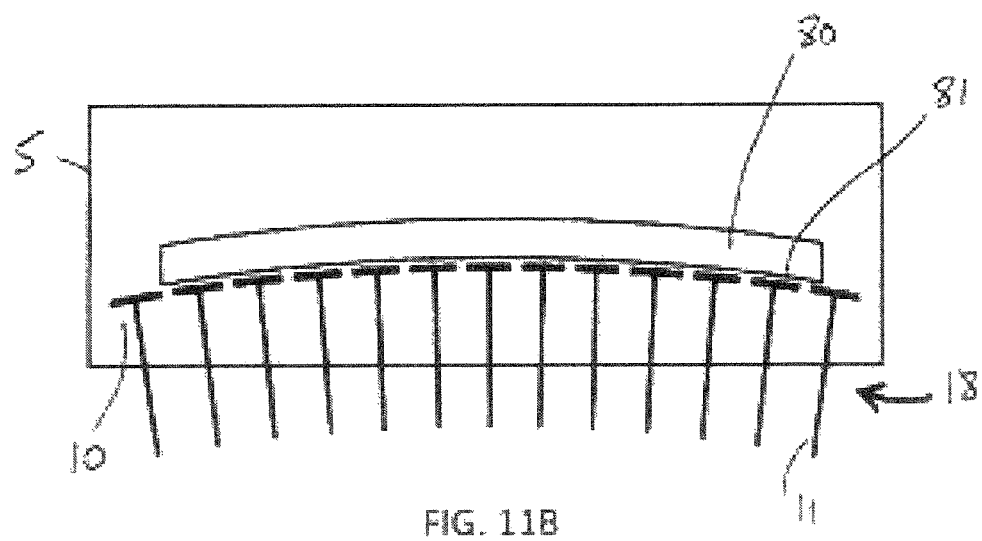
FIG. 11B illustrates a schematic diagram of a ribbed panel after it has been heated and softened to take on the shape of the mold, in accordance with various embodiments.

Referring to FIG. 11A, and FIG. 11B, a schematic view of an oven and adjustable mold 18 is illustrated according to various embodiments. FIG. 11A illustrates this system with a ribbed panel 80 before shaping, and FIG. 11B illustrates the system after the panel 80 has deformed by gravity sagging, or by sagging with increased pressure to the shape of the upper surface of the adjustable mold 18. In various embodiments, the panel 80 may be of glass or metal, and may comprise a facesheet 81 and a backing structure 82 (shown in FIG. 12A and FIG. 12B). The adjustable mold 18 may be constructed so as to form part of the insulated perimeter 5 of a heated volume.

The adjustable mold 18 may comprise contact segments 10 of the mold that touch the panel 80 after sagging and define its sagged shape, and may be convex in shape. The contact segments 10 may together form a molding surface configured to shape the panel 80. Coupling elements 11 may link the contact segments 10 to the position actuators outside the heated volume.

Figure 12A:
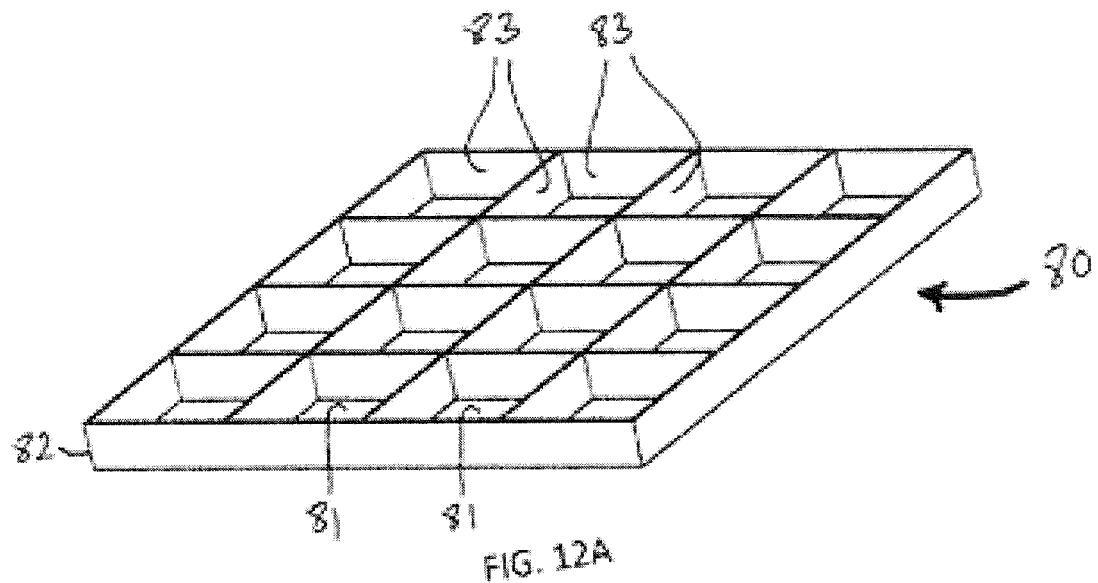
FIG. 12A illustrates a schematic isometric view of a flat panel with ribbed backing prior to shaping, in accordance with various embodiments.
Figure 12B:
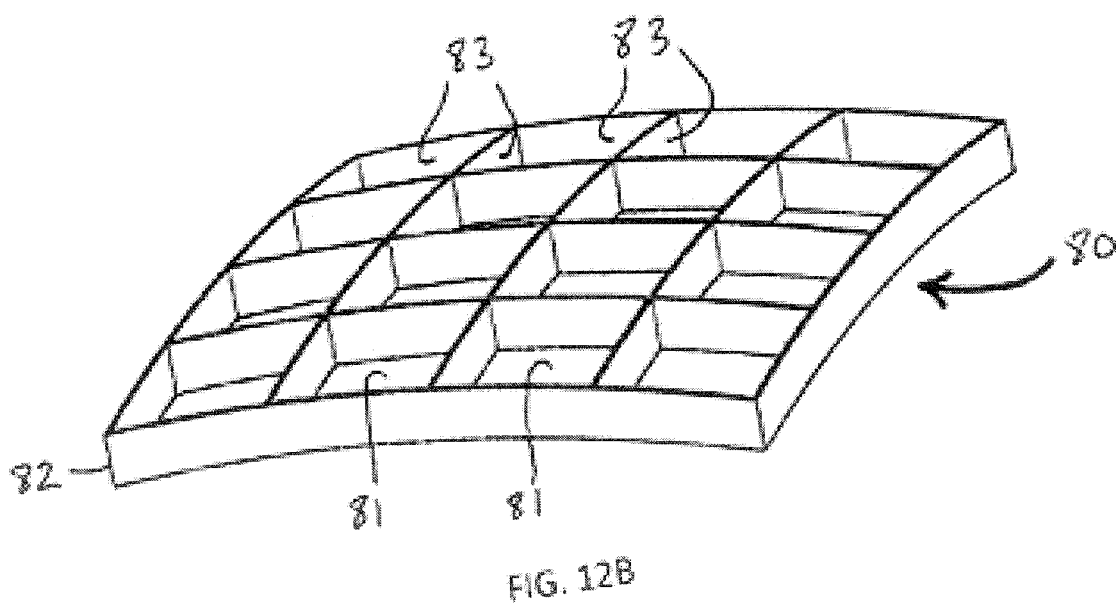
FIG. 12B illustrates a schematic isometric view of a panel with ribbed backing after shaping on the adjustable mold, in accordance with various embodiments.

Referring to FIG. 12A, and FIG. 12B, a schematic view of a panel 80 before and after shaping are illustrated according to various embodiments. FIG. 12A illustrates in perspective view a panel before slumping, comprising a flat facesheet 81 with a supporting structure 82 comprising orthogonal ribs 83. FIG. 12B illustrates in perspective view the same panel after heating and slumping over a convex mold 18. The facesheet 81 has now taken on a concave shape, and the ribs 83 of the supporting structure 82 have stretched and bent to conform to the new facesheet shape. In some embodiments, weights may be placed on the facesheet 81 to increase the gravitational forces driving the stretching and bending processes. An advantage of this method of formation of a ribbed structure is that the panel as initially prepared may be of low accuracy and simple geometry, as for the rectangular ribs 83 illustrated. After slumping, the facesheet accuracy is determined by the accuracy of the mold, independent of the accuracy of the initially fabricated structure. The ribs ensure that the as-formed shape is resistant to bending deformation when in use.

It will be apparent to those skilled in the art that the three embodiments described above are simply representative examples of the adjustable mold within the scope of this invention, and that other configurations will also fall within its scope.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

What is claimed is:

1. A system comprising:
   an oven comprising an insulated perimeter;
   a molding surface located within an interior of the oven;
   a plurality of coupling elements each having a contact segment, collectively making up a plurality of contact segments, wherein the plurality of contact segments form the molding surface and define a molding surface shape, wherein the molding surface shape defines a molded shape of a panel heated within the oven, wherein the molding surface is configured to support the molded shape of the panel, wherein the plurality of coupling elements extend through the insulated perimeter, and wherein the panel comprises at least one of glass or metal; and
   a plurality of position actuators coupled to the plurality of coupling elements and configured to move the plurality of coupling elements and the plurality of contact segments, wherein the plurality of position actuators are located exterior of the oven.

2. The system of claim 1, wherein the plurality of contact segments are discrete components from the plurality of coupling elements, wherein each of the plurality of coupling elements is coupled to at least one of the plurality of contact segments.

3. The system of claim 2, wherein the plurality of contact segments are hexagonal.

4. The system of claim 2, further comprising a positioning plate associated with each contact segment of the plurality of contact segments, wherein the positioning plate is movable by position actuators, and an insulating block positioned between a contact segment in the plurality of contact segments and its associated positioning plate.

5. The system of claim 4, further comprising a rigid reference structure external to the oven, wherein the rigid reference structure supports fixed ends of the position actuators.

6. The system of claim 4, further comprising a plurality of blades coupled to each contact segment of the plurality of contact segments and the positioning plate associated with each contact segment, wherein the plurality of blades form the plurality of coupling elements.

7. The system of claim 2, wherein each contact segment of the plurality of contact segments comprises a quartz tube having a rounded end, and the rounded ends of the plurality of contact segments form the molding surface.

8. The system of claim 1, further comprising a first plurality of cooling jets configured to direct cooling air to the molding surface, and a second plurality of cooling jets configured to direct cooling air to the panel in contact with the molding surface, and wherein the first plurality of cooling jets and the second plurality of cooling jets are configured to rapidly cool and strengthen or temper the panel.

9. The system of claim 1, further comprising a cooling jet located at least partially within an interior of a contact segment in the plurality of contact segments.

10. The system of claim 1, wherein the molding surface comprises a metal panel, wherein the metal panel is cut by a plurality of slits configured to increase a flexibility of the metal panel.

11. A method comprising:
    adjusting a plurality of coupling elements to form a molding surface shape of a molding surface, wherein each of the plurality of coupling elements comprises a contact segment, collectively making up a plurality of contact segments, wherein the plurality of contact segments form the molding surface and define the molding surface shape, wherein the coupling elements extend through a perimeter of an oven;
    positioning a panel above the molding surface, wherein the panel comprises at least one of glass or metal;
    heating the panel;
    causing the panel to deform into a molded shape and contact the molding surface, wherein the molded shape is defined by the molding surface shape, wherein the molded shape of the panel is supported by the molding surface; and
    cooling the panel.

12. The method of claim 11, further comprising:
    measuring a shape of the panel;
    adjusting at least one of the coupling elements to modify the molding surface shape; and
    shaping a new panel using the molding surface, wherein the shaping the new panel comprises:

positioning the new panel above the molding surface;
heating the new panel;
causing the new panel to deform and contact the molding surface, forming a new panel shape that is defined by the molding surface shape, wherein the new panel shape of the new panel is supported by the molding surface; and
cooling the new panel.

13. The method of claim 12, further comprising iteratively adjusting the coupling elements until a desired molding surface shape of the molding surface is achieved.

14. The method of claim 11, wherein the the plurality of coupling elements are coupled to a plurality of position actuators located exterior to the oven, wherein the oven is configured to heat the panel.

15. The method of claim 11, further comprising cooling the panel with a cooling jet, wherein the cooling jet passes through an interior of a coupling element.

16. The method of claim 11, further comprising shaping a plurality of replica panels without further adjusting the coupling elements.

17. The method of claim 11, wherein the plurality of contact segments are discrete components from the plurality of coupling elements, wherein the plurality of contact segments are coupled to the plurality of coupling elements.

* * * * *